United States Patent
Inamdar et al.

(10) Patent No.: US 12,519,746 B2
(45) Date of Patent: Jan. 6, 2026

(54) SDWAN DATA-PLANE RESILIENCY FOR EXTENDED SURVIVABILITY

(71) Applicant: Cisco Technology, Inc., San Jose, CA (US)

(72) Inventors: Amjad Inamdar, Karnataka (IN); Anoop V A, Bangalore (IN); Syed Arslan Ahmed, Karnataka (IN); Ramaswamy Rangaswamy, Bangalore (IN); Reetesh Kapahi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 18/396,886

(22) Filed: Dec. 27, 2023

(65) Prior Publication Data
US 2025/0219986 A1    Jul. 3, 2025

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 61/2539* | (2022.01) | |
| *H04L 61/256* | (2022.01) | |

(52) U.S. Cl.
CPC ........ *H04L 61/256* (2013.01); *H04L 61/2539* (2013.01)

(58) Field of Classification Search
CPC .......................... H04L 61/256; H04L 61/2539
USPC ........................................................ 709/224
See application file for complete search history.

(56) References Cited

U.S. PATENT DOCUMENTS

| | | | | |
|---|---|---|---|---|
| 10,616,246 | B2 * | 4/2020 | Kikuchi | H04L 63/0209 |
| 11,343,188 | B2 * | 5/2022 | Chen | H04L 45/7452 |
| 11,374,813 | B1 * | 6/2022 | Chunduru Venkata | H04L 41/0816 |
| 11,665,131 | B1 * | 5/2023 | Subramanian | H04L 61/2517 709/245 |
| 11,765,244 | B1 * | 9/2023 | Barclay | H04L 67/51 709/226 |
| 11,916,966 | B2 * | 2/2024 | Klemetti | H04L 63/10 |
| 12,316,527 | B2 * | 5/2025 | Ragland | H04L 43/0894 |
| 2009/0073886 | A1 * | 3/2009 | Burns | H04L 43/50 370/248 |
| 2010/0329173 | A1 * | 12/2010 | Murphy | H04L 65/1016 370/313 |
| 2013/0058256 | A1 * | 3/2013 | Li | H04L 61/2517 370/255 |
| 2013/0179580 | A1 * | 7/2013 | Short | H04L 63/0272 709/227 |

(Continued)

*Primary Examiner* — Hamza N Algibhah
(74) *Attorney, Agent, or Firm* — Polsinelli P.C.

(57) ABSTRACT

The present technology provides solutions for maintaining communications within a software-defined wide area network (SDWAN) when one or more devices in the SDWAN are isolated from one or more controllers. An example method includes receiving, at a static edge device associated with a static wide area network (WAN) Internet Protocol (IP) address in a data plane of the SDWAN, data from a first device communicating through an edge device of a first Internet service provider (ISP) of the SDWAN, where the first device is associated with a private IP address, associating, by the static edge device, the first device with the private IP address, and communicating, by the static edge device, with the first device at the private IP address. Systems and computer-readable media are also provided.

20 Claims, 4 Drawing Sheets

(56) References Cited

U.S. PATENT DOCUMENTS

| | | | |
|---|---|---|---|
| 2015/0180769 A1* | 6/2015 | Wang | H04L 45/38 |
| | | | 370/236 |
| 2019/0028300 A1* | 1/2019 | Mathew | G06F 9/45558 |
| 2019/0372889 A1 | 12/2019 | Michael et al. | |
| 2020/0267051 A1* | 8/2020 | Ranjbar | H04L 41/0663 |
| 2020/0328978 A1* | 10/2020 | Gupta | H04L 45/306 |
| 2021/0036987 A1 | 2/2021 | Mishra et al. | |
| 2021/0099360 A1* | 4/2021 | Parsons | H04L 63/062 |
| 2021/0185013 A1* | 6/2021 | Zhang | H04L 61/5014 |
| 2021/0243053 A1* | 8/2021 | Dunbar | H04L 12/4675 |
| 2021/0377160 A1* | 12/2021 | K | H04L 45/64 |
| 2021/0409303 A1* | 12/2021 | Pande | H04L 12/4633 |
| 2022/0029857 A1* | 1/2022 | Ponnuru | H04L 12/4633 |
| 2022/0045984 A1* | 2/2022 | Bareket | H04L 61/255 |
| 2022/0263792 A1* | 8/2022 | Dodd-Noble | H04L 61/2517 |
| 2022/0294758 A1* | 9/2022 | Desmouceaux | H04L 45/74 |
| 2022/0386215 A1* | 12/2022 | Dillon | H04B 7/18519 |
| 2023/0052974 A1* | 2/2023 | Thoria | H04L 63/029 |
| 2023/0079689 A1 | 3/2023 | Dunbar | |
| 2023/0119414 A1* | 4/2023 | Mammen | H04L 45/76 |
| | | | 709/227 |
| 2023/0121871 A1* | 4/2023 | Mayya | H04L 61/25 |
| | | | 709/245 |
| 2023/0199075 A1* | 6/2023 | Toy | H04L 67/34 |
| | | | 709/226 |
| 2023/0216733 A1* | 7/2023 | Bevan | H04L 41/0806 |
| | | | 709/223 |
| 2024/0224155 A1* | 7/2024 | Dillon | H04B 7/18584 |
| 2025/0007875 A1* | 1/2025 | Kweon | H04L 61/2514 |
| 2025/0119454 A1* | 4/2025 | Sanders | H04L 41/0806 |
| 2025/0133611 A1* | 4/2025 | Kassahun | H04W 76/12 |
| 2025/0133612 A1* | 4/2025 | Kassahun | H04W 76/12 |
| 2025/0150382 A1* | 5/2025 | Ragland | H04L 45/85 |

* cited by examiner

SDWAN DATA-PLANE RESILIENCY FOR EXTENDED SURVIVABILITY

TECHNICAL FIELD

The present technology relates to a resilient software-defined wide area network SDWAN dataplane, and more particularly, to using a static SDWAN edge device to receive communications from devices that are isolated from a controller of the SDWAN.

BACKGROUND

SDWAN has become the de facto standard for inter-site secure WAN connectivity for digital enterprises today. SDWAN uses a centralized controller architecture for control and data plane separation for scalability, single pane of glass management and orchestration. As controllers play the role of centralized brains of SDWAN, the SDWAN data plane device connectivity to the controllers is essential for its operation. Despite redundant controller designs, there are very high chances of devices losing connectivity to controllers and operating in a scenario without communications with the controllers. While there are some techniques for mitigating these effects, the current methods do not account for many of the failure scenarios as is evident from outages that still continue to this day.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
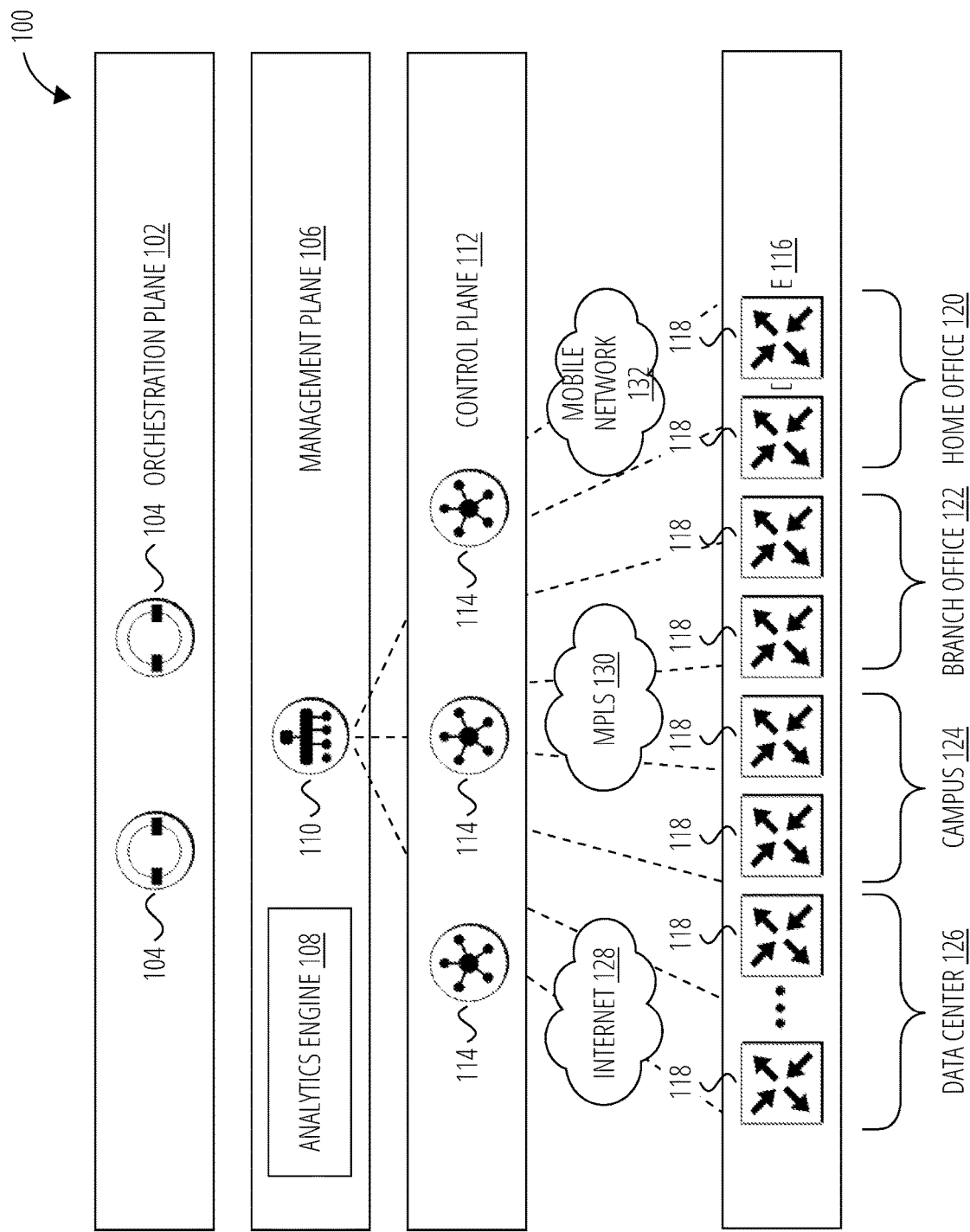
FIG. 1 illustrates an example of a high-level network architecture according to some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are systems, methods, and computer-readable media for maintaining communications within a software-defined wide area network (SDWAN) when one or more devices in the SDWAN are isolated from one or more controllers.

According to at least one example, a method for maintaining communications within a software-defined wide area network (SDWAN) when one or more devices in the SDWAN are isolated from one or more controllers, the method includes receiving, at a static edge device associated with a static wide area network (WAN) Internet Protocol (IP) address in a data plane of the SDWAN, data from a first device communicating through an edge device of a first Internet service provider (ISP) of the SDWAN, where the first device is associated with a private IP address, associating, by the static edge device, the first device with the private IP address, and communicating, by the static edge device, with the first device at the private IP address.

According to at least one other example, a system is provided. The system can include a processor and a non-transitory memory storing computer-executable instructions thereon, where the computer-executable instructions, when executed by the processor, cause the processor to perform operations includes receiving, at a static edge device associated with a static wide area network (WAN) Internet Protocol (IP) address in a data plane of the SDWAN, data from a first device communicating through an edge device of a first Internet service provider (ISP) of the SDWAN, where the first device is associated with a private IP address, associating, by the static edge device, the first device with the private IP address, and communicating, by the static edge device, with the first device at the private IP address.

According to at least one other example, a non-transitory computer-readable medium is also provided. The non-transitory computer-readable medium can include instructions thereon, where the instructions, when executed by one or more processors, cause the one or more processors to perform operations includes receiving, at a static edge device associated with a static wide area network (WAN) Internet Protocol (IP) address in a data plane of the SDWAN, data from a first device communicating through an edge device of a first Internet service provider (ISP) of the SDWAN, where the first device is associated with a private IP address, associating, by the static edge device, the first device with the private IP address, and communicating, by the static edge device, with the first device at the private IP address.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

Description

Software-defined wide area networks (SDWAN) are a type of networking technology based on software-defined networking (SDN) principles to optimize the performance of wide area networks (WANs). For example, SDWANs rely on a SDN principle of control and data plane separation with centralized controller-based architecture for management, network address translation (NAT) discovery & traversal and distribution of routes and encryption keys.

As a SDWAN dataplane often relies completely on controllers for learning and distribution of routing information and encryption keys, controllers are deployed with redundancy to maximize controller availability and minimize the possibility and duration of dataplane being headless isolated from the controllers.

Despite redundant designs, there are high chances of devices getting isolated from controllers due to various reasons such as loss of WAN connectivity, failure of the data centre where controllers are hosted, software defects, device to controller secure connectivity failure due to certificate expiry or human errors. This can severely impact businesses causing revenue losses and can impact lives in mission critical use cases. This is evident from some of the recent outages resulting from devices getting isolated from controllers.

One current approach includes graceful restart features that allow edge devices to continue using the last known routing information from the controller. Another current approach is to implement traffic fallback through an underlay that is used as a backup path for data traffic when the overlay is down. While these approaches improve resiliency, these approaches also have limitations, which can result in common failure scenarios. For example, some systems implement a long duration security association (SA) lifetime. However, these long SA lifetimes do not account for SDWAN dataplane overlay failures due to WAN link flaps and assignment of a different Internet protocol (IP) address by the Internet service provider (ISP) to the SDWAN edge devices. Similarly, traffic falling back to underlays only work with WAN links (e.g., multiprotocol label switching or MPLS) that can route Enterprise private prefixes. In other words, this approach would not work on an Internet underlay, which gives up the value of SDWAN and Internet-only SDWAN sites. More specifically, the SDWAN dataplane overlay offers rich functionality such as segmentation, application-aware routing, etc. Traffic routing over underlay would not be able to preserve the segmentation and provide application service-level agreement (SLA) guarantees. Accordingly, this can degrade application experience, has security implications, and in some instances, may not even be able to route segmented traffic.

Therefore, it is of interest to preserve and ensure continuity of the SDWAN dataplane overlay that offers segmentation, application aware routing, and other advanced features to ensure seamless continuity of business operations and user experience even in the event of failures of communication between the controller(s) and other devices.

The present technology provides solutions for improving resiliency in SDWAN fabric dataplanes (e.g., for unexpected events causing isolation from controllers) and ensures continuity of the functionality-rich and secure SDWAN dataplane overlay.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of edge network devices 118 (e.g., switches, routers, etc.) in an overlay network. The orchestration plane 102 can include one or more physical or virtual network orchestrator appliances 104. The network orchestrator appliances 104 can perform the initial authentication of the edge network devices 118 and orchestrate connectivity between devices of the control plane 112 and the data plane 116. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 106 can be responsible for central configuration and monitoring of a network. The management plane 106 can include one or more physical or virtual network management appliances 110. In some embodiments, the network management appliances 110 can provide centralized management of the network via a graphical user interface to enable a user to monitor, configure, and maintain the edge network devices 118 and links (e.g., internet transport network 128, MPLS network 130, 4G/Mobile network 132) in an underlay and overlay network. The network management appliances 110 can support multi-tenancy and enable centralized management of logically isolated networks associated with different entities (e.g., enterprises, divisions within enterprises, groups within divisions, etc.). Alternatively or in addition, the network management appliances 110 can be a dedicated network management system for a single entity. In some embodiments, physical or virtual Cisco® SD-WAN vManage appliances can operate as the network management appliances 110. The management plane 106 can include an analytics engine 108 to provide analytics for the network.

The control plane 112 can build and maintain a network topology and make decisions on where traffic flows. The control plane 112 can include one or more physical or virtual network control appliances 114. The network control appliances 114 can establish secure connections to each edge network device 118 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliances 114 can operate as route reflectors. The network control appliances 114 can also orchestrate secure connectivity in the data plane 116 between and among the edge network devices 118. For example, in some embodiments, the network control appliances 114 can distribute crypto key information among the edge network devices 118. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliances 114.

The data plane 116 can be responsible for forwarding packets based on decisions from the control plane 112. The data plane 116 can include the edge network devices 118, which can be physical or virtual edge network devices. The edge network devices 118 can operate at the edges various network environments of an organization, such as in one or more data centers 126, campus networks 124, branch office networks 122, home office networks 120, and so forth, or in the cloud (e.g., Infrastructure as a Service (IaaS), Platform as a Service (PaaS), SaaS, and other cloud service provider networks). The edge network devices 118 can provide secure data plane connectivity among sites over one or more WAN transports, such as via one or more internet transport networks 128 (e.g., Digital Subscriber Line (DSL), cable, etc.), MPLS networks 130 (or other private packet-switched network (e.g., Metro Ethernet, Frame Relay, Asynchronous Transfer Mode (ATM), etc.), mobile networks 132 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 118 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 118.

Figure 2:
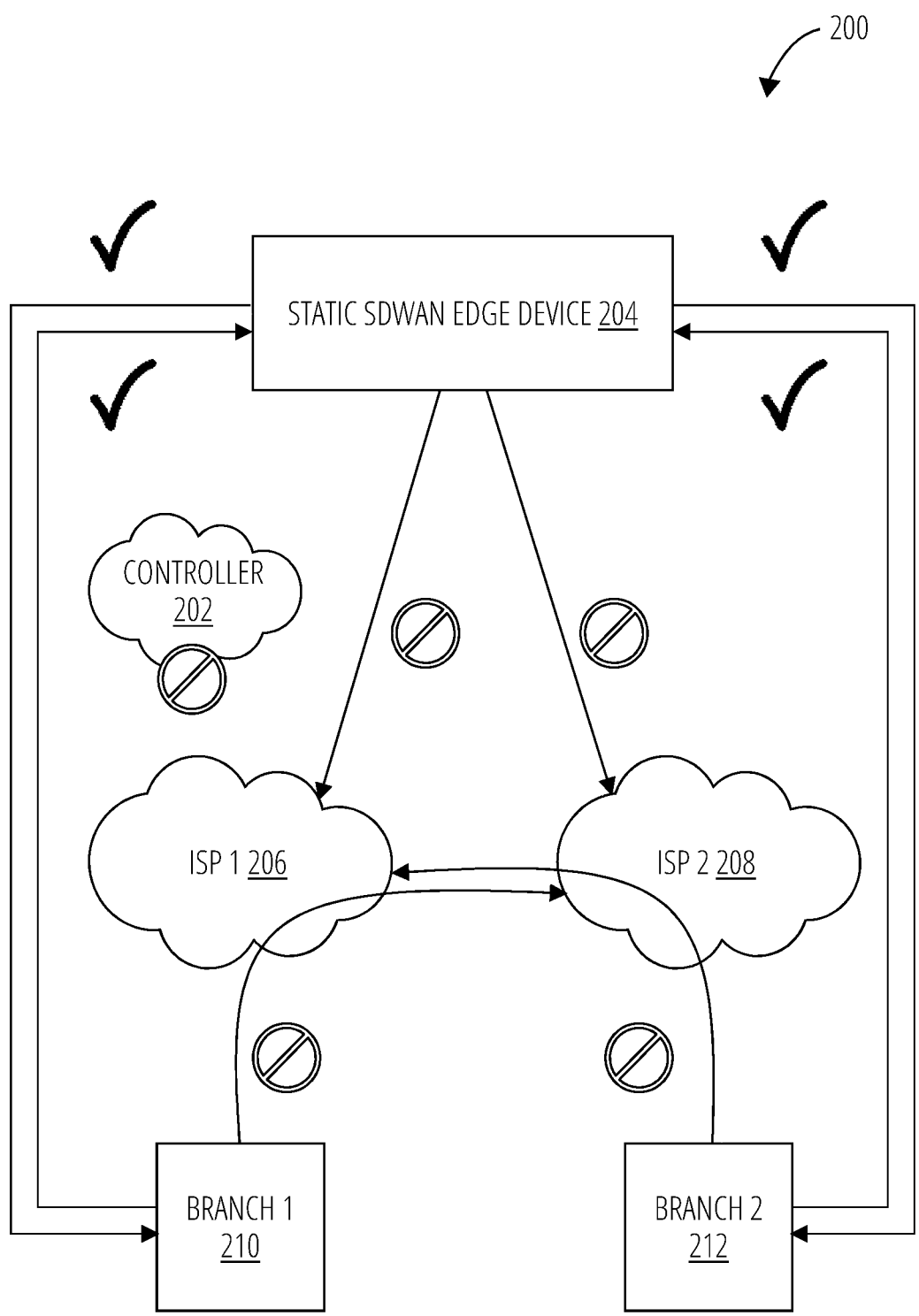
FIG. 2 illustrates an example software-defined wide area network (SDWAN) environment according to some aspects of the present technology.

FIG. 2 illustrates an example SDWAN environment 200 according to some aspects of the present technology. SDWAN environment 200 can include a controller 202, a static SDWAN edge device 204, one or more ISPs 206, 208, and branches 210, 212 communicating through the ISPs 206, 208.

Controller 202 can be configured to control traffic flow. For example, the controller 202 can be configured as a network control appliance 114 discussed above with respect to FIG. 1.

In some instances, however, communications between the controller 202 and other devices, such as devices in branches 210, 212, can fail. In other words, devices can become isolated or otherwise lose connection with the controller 202. When communications between the controller 202 and devices are unavailable, SDWAN devices can lose data plane connectivity with the rest of the network and cause outages and/or other issues.

For example, one common controller-isolated issue is when a SDWAN-edge WAN IP address changes. As discussed briefly above, one benefit of SDWAN is that the SDWAN edge devices at datacenters, hubs, and branches can have WAN IPs and can be behind NAT. Controllers help devices with NAT discovery and NAT traversal for inter-device communication. However, in controller-isolated scenarios, the WAN IP address change invalidates NAT learning and new NAT discovery does not occur. Consequently, communications to and from the device are blocked. For example, when a device in branch 1 210 loses connectivity with the controller and ISP 1 206 changes the WAN IP address of the device, devices in branch 2 212 would be unable to communicate with the device.

As another example, another common controller-isolated issue is when a NAT entry is deleted or expires on ISP NAT. For the SDWAN edge devices behind a ISP NAT, controllers 202 facilitate NAT discovery and advertise of new NAT learning in the fabric for continued communication between devices when the NAT entries get deleted, expire, and/or new entries are created. However, in controller-isolated scenarios, the new NAT learning and advertisement is unable to occur, which results in blocking communications to and from the device. For example, when a device in branch 1 210 loses connectivity with the controller 202 and a NAT entry for the device in branch 1 210 is deleted, devices in branch 2 212 would be unable to communicate with the device.

As yet another example, another common controller-isolated issue is when a security parameter expires. Controllers 202 are used to distribute encryption keys instead of direct key negotiation between devices in SDWANs to provide better scalability. However, in controller-isolated scenarios, the controller 202 is unable to provide and/or refresh keys. While long key lifetimes are often used as one avenue for mitigating these effects, devices can still lose communication with the controllers 202 just before expiration of the current key. Thus, the key can still expire, which would also result in communication outages. For example, an IP security (IPsec) key of a device in branch 1 210 can expire after the device loses connectivity with the controller 202, resulting in communication issues between the device and devices in branch 2 212.

The SDWAN environment 200 illustrated in FIG. 2 is configured to be more resilient in addressing the above issues. More specifically, SDWAN environment 200 leverages the static SDWAN edge devices 204 to maintain communications even when devices lose communication with the controller 202. The static SDWAN edge devices 204 are configured to have static, public IP addresses that are not behind ISP NAT. By utilizing static, public IP addresses, the static SDWAN edge devices 204 act as data plane anchors that are always reachable by devices in the SDWAN environment 200. The static SDWAN edge devices 204 can deployed as regional hubs and/or datacenters. Additionally, the static SDWAN edge devices 204 can assist with NAT traversal when events (e.g., WAN IP address changes, NAT entry deletions, expiry events, etc.) happen with the SDWAN edge devices at the branches and other sites with dynamic IPs and/or are behind ISP NAT. The static SDWAN edge devices 204 can also act as gateways to keep all sites connected and data traffic flowing between them.

For example, the SDWAN environment 200 is configured for NAT re-learning and traversal utilizing the static SDWAN edge devices 204 as anchors or hubs. More specifically, for a SDWAN edge at a site (e.g., an edge device at branch 1 210), if the WAN IP address changes and/or if the NAT entry for the SDWAN edge in the ISP NAT is deleted and/or recreated, the data traffic and probes directed to this branch would fail to reach the SDWAN edge. The data traffic and probes from this branch would also fail to reach their destination if a remote site also had an WAN IP change and/or NAT entry deletion. However, static SDWAN edge devices 204 are not hidden behind NAT and have static public IP addresses that are constantly able to receive probes and data traffic from affected branches with the new WAN IP and/or NAT entry. Accordingly, the static SDWAN edge devices 204 can learn the new post-NAT IP address and port, which can then be used to restore bidirectional communication between the static SDWAN edge devices 204 and the SDWAN edge of the branch.

As another example, the SDWAN environment 200 is configured for automatic extension of security parameters and/or direct key refreshes. More specifically, connected SDWAN edge devices can refresh keys directly over probes to the static SDWAN edge devices 204. The SDWAN edge devices, including the static SDWAN edge devices 204, are configured to determine that SDWAN edge devices are isolated from the controllers 202 and, based on the SDWAN edge devices losing connectivity with the controllers, automatically refresh or extend existing security parameters and/or generate new security parameters for the SDWAN edge devices. In some embodiments, the SDWAN edge devices can send a probe to the static SDWAN edge devices 204 and/or other edge devices prior to expiration of a current security parameter to refresh the security parameters and/or receive a new security parameter directly over the probes. In some embodiments, the security parameters are IPsec keys and/or SAs. Consequently, IPsec protected BFD probes between devices can be extended to allow devices to exchange the new and/or refreshed keys. In other words, while the static SDWAN edge device 204 functions as an anchor to ensure continued communication between devices (e.g., even when isolated from controllers), the automatic extension of lifetime for and/or direct exchanges of IPsec keys/SAs can be performed by all SDWAN edge devices, including the static SDWAN edge device 204.

Several benefits are provided in the SDWAN environment 200 by utilizing static SDWAN edge devices 204 having static public IP addresses and not being obscured behind NAT including, but not limited to, automatic recovery from WAN IP address changes of SDWAN edge devices at branches (e.g., branch 1 210, branch 2 212) and behind NATs of ISPs (e.g., ISP 1 206, ISP 2 208) by using the data plane NAT traversal, automatic recovery from deletion or expiration of NAT entries in the ISP NAT, and automatic extension of IPsec encryption key lifetimes and/or direct refresh of keys between devices.

Figure 3:
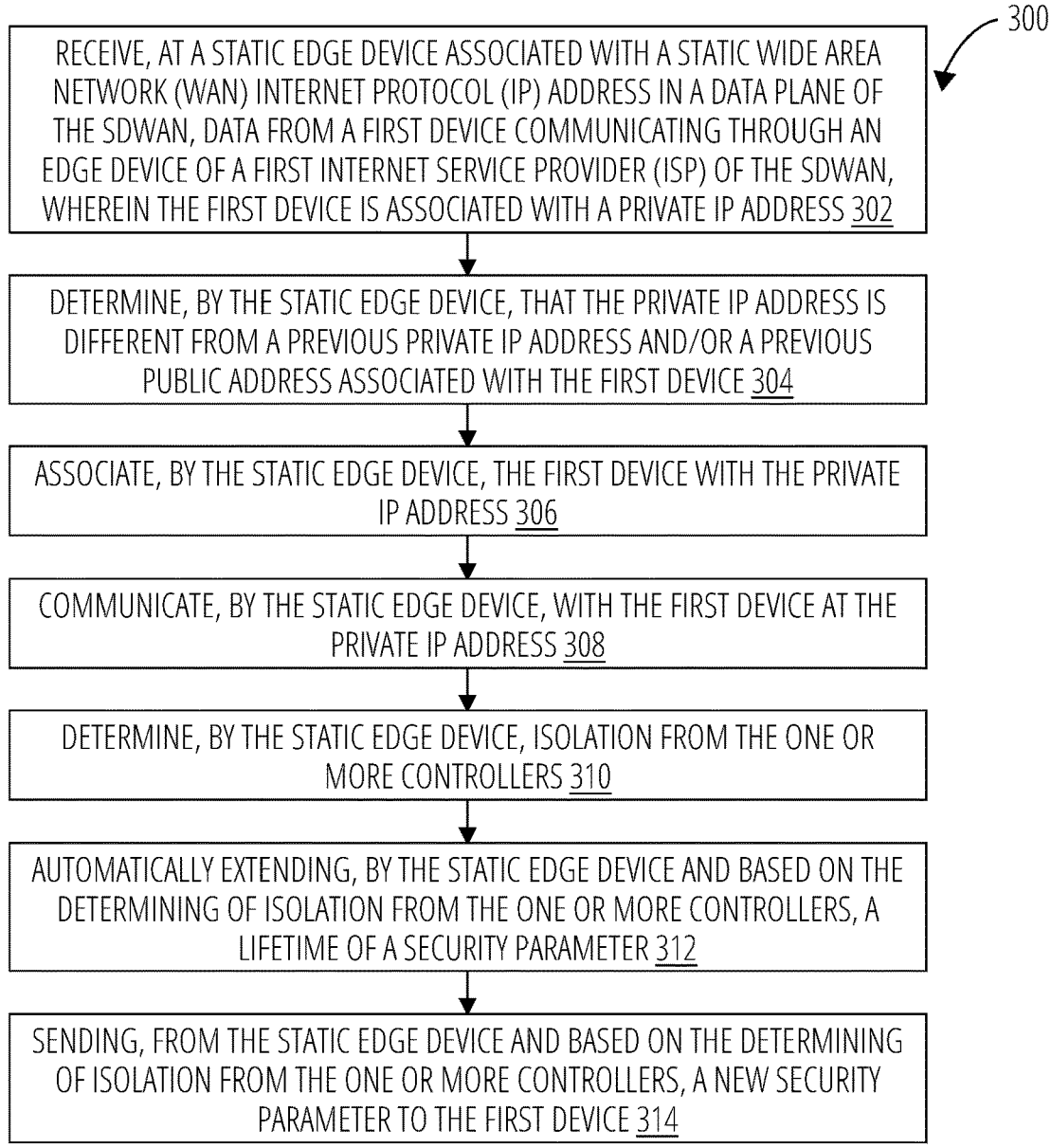
FIG. 3 illustrates a method for maintaining communications within a software-defined wide area network (SDWAN) when one or more devices in the SDWAN are isolated from one or more controllers according to some aspects of the present technology.

FIG. 3 illustrates an example method 300 for maintaining communications within a SDWAN when one or more devices in the SDWAN are isolated from one or more controllers. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes receiving, at a static edge device associated with a static WAN IP address in a data plane of the SDWAN, data from a first device communicating through an edge device of a first ISP of the SDWAN, wherein the first device is associated with a private IP address at step 302. In some embodiments, the static WAN IP address of the static edge device is a static public WAN IP address.

In step 304, the method 300 can include determining, by the static edge device, that the private IP address is different from a previous private IP address associated with the first device. In some embodiments, associating the first device with the private IP address includes updating the previous private IP address to the private IP address.

In step 304 of some embodiments, the method 300 can additionally and/or alternatively include determining, by the static edge device, that the public IP address is different from a previous public IP address. For example, the ISP can include a NAT entry identifying a translation between a public IP address associated with the first device and the private IP address. In some embodiments, the first device can be associated with the private IP address by associating the first device with the public IP address. In some embodiments, Associating the first device with the public IP address can include updating the previous public IP address to the public IP address.

In step 306, the method 300 can include associating, by the static edge device, the first device with the private IP address.

In step 308, the method 300 can include communicating, by the static edge device, with the first device at the private IP address.

In step 310, the method 300 can include determining, by the static edge device, isolation from the one or more controllers. It is to be understood that any edge device can be configured to determine isolation of devices from the one or more controllers.

In step 312, the method 300 can include automatically extending, by the static edge device and based on the determining of isolation from the one or more controllers, a lifetime of a security parameter. In some embodiments, the security parameter is IPsec key and/or a security association. It is to be understood that any edge device can be configured to determine automatically extend a lifetime of a security parameter.

Additionally and/or alternatively to step 312, method 300 can include sending, from the static edge device and based on the determining of isolation from the one or more controllers, a new security parameter to the first device at step 314. In some embodiments, the new security parameter is a new IPsec key and/or a new security association. It is to be understood that any edge device can be configured to send a new security parameter to one or more devices.

Figure 4:
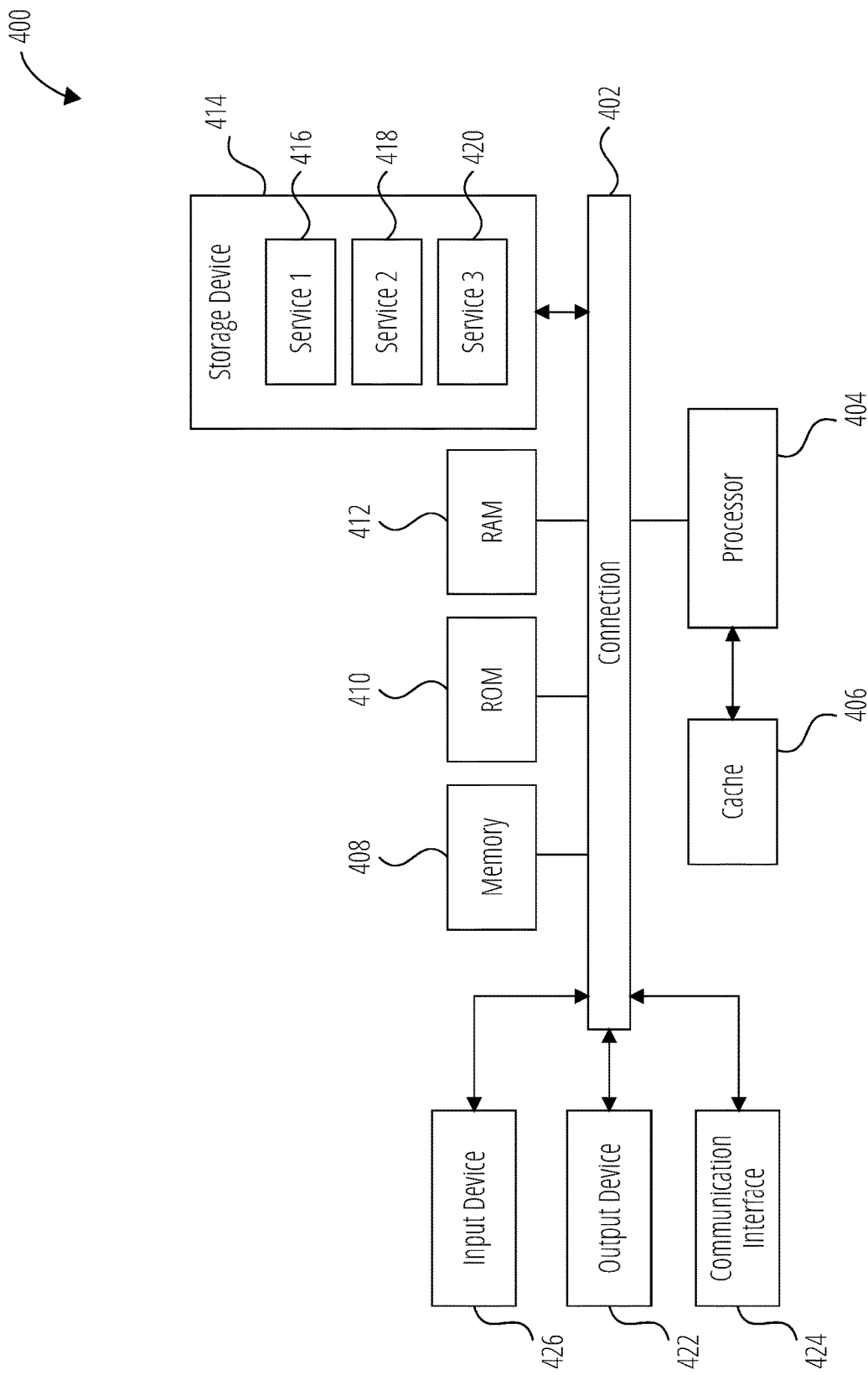
FIG. 4 shows an example of a system for implementing certain aspects of the present technology.

FIG. 4 shows an example of computing system 400, which can be for example any computing device making up network architecture 100, controller 202, static SDWAN edge device 204, ISP 1 206, ISP 2 208, devices in branch 1 210, devices branch 2 212, or any component(s) thereof in which the components of the system are in communication with each other using connection 402. Connection 402 can be a physical connection via a bus, or a direct connection into processor 404, such as in a chipset architecture. Connection 402 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 400 includes at least one processing unit (CPU or processor) 404 and connection 402 that couples various system components including system memory 408, such as read-only memory (ROM) 410 and random access memory (RAM) 412 to processor 404. Computing system 400 can include a cache of high-speed memory 406 connected directly with, in close proximity to, or integrated as part of processor 404.

Processor 404 can include any general purpose processor and a hardware service or software service, such as services 416, 418, and 420 stored in storage device 414, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

Storage device 414 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 414 can include software services, servers, services, etc., that when the code that defines such software is executed by the processor 404, it causes the system to perform a function. In some embodiments, a hardware service that performs a particular function can include the software component stored in a computer-readable medium in connection with the necessary hardware components, such as processor 404, connection 402, output device 422, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for maintaining communications within a software-defined wide area network (SDWAN) when one or more devices in the SDWAN are isolated from one or more controllers, the method comprising:
   receiving, at a static edge device associated with a static wide area network (WAN) Internet Protocol (IP) address in a data plane of the SDWAN, data from a first device communicating through an edge device of a first Internet service provider (ISP) of the SDWAN, wherein the first device is associated with a private IP address;
   associating, by the static edge device, the first device with the private IP address;
   communicating, by the static edge device, with the first device at the private IP address;
   determining, by the static edge device, isolation from the one or more controllers; and
   automatically extending, by the static edge device and based on the determining of isolation from the one or more controllers, a lifetime of a security parameter.

2. The method of claim 1, wherein the static WAN IP address of the static edge device is a static public WAN IP address.

3. The method of claim 1, the method further comprising:
   determining, by the static edge device, that the private IP address is different from a previous private IP address associated with the first device,
   wherein associating the first device with the private IP address includes updating the previous private IP address to the private IP address.

4. The method of claim 1, wherein the ISP includes a network address translation (NAT) entry identifying a translation between a public IP address associated with the first device and the private IP address, the method further comprising:
   determining, by the static edge device, that the public IP address is different from a previous public IP address, wherein the first device is associated with the private IP address by associating the first device with the public IP address, and wherein associating the first device with the public IP address includes updating the previous public IP address to the public IP address.

5. The method of claim 1, wherein the security parameter is an IP security (IPsec) key or a security association.

6. The method of claim 1, the method further comprising:
sending, from the static edge device and based on the determining of isolation from the one or more controllers, a new security parameter to the first device.

7. The method of claim 6, wherein the new security parameter is a new IPsec key or a new security association.

8. A system comprising:
a processor; and
a non-transitory memory storing computer-executable instructions thereon, wherein the computer-executable instructions, when executed by the processor, cause the processor to perform operations comprising:
receiving, at a static edge device associated with a static wide area network (WAN) Internet Protocol (IP) address in a data plane of a software-defined wide area network (SDWAN), data from a first device communicating through an edge device of a first Internet service provider (ISP) of the SDWAN, wherein the first device is associated with a private IP address;
associating, by the static edge device, the first device with the private IP address;
communicating, by the static edge device, with the first device at the private IP address;
determining, by the static edge device, isolation from one or more controllers; and
automatically extending, by the static edge device and based on the determining of isolation from the one or more controllers, a lifetime of a security parameter.

9. The system of claim 8, wherein the static WAN IP address of the static edge device is a static public WAN IP address.

10. The system of claim 8, wherein the computer-executable instructions, when executed by processor, cause the processor to further perform operations comprising:
determining, by the static edge device, that the private IP address is different from a previous private IP address associated with the first device,
wherein associating the first device with the private IP address includes updating the previous private IP address to the private IP address.

11. The system of claim 8, wherein the ISP includes a NAT entry identifying a translation between a public IP address associated with the first device and the private IP address, wherein the computer-executable instructions, when executed by processor, cause the processor to further perform operations comprising:
determining, by the static edge device, that the public IP address is different from a previous public IP address,
wherein the first device is associated with the private IP address by associating the first device with the public IP address, and wherein associating the first device with the public IP address includes updating the previous public IP address to the public IP address.

12. The system of claim 8, wherein the security parameter is an IP security (IPsec) key or a security association.

13. The system of claim 8, wherein the computer-executable instructions, when executed by processor, cause the processor to further perform operations comprising:
sending, from the static edge device and based on the determining of isolation from the one or more controllers, a new security parameter to the first device.

14. The system of claim 13, wherein the new security parameter is a new IPsec key or a new security association.

15. A non-transitory computer-readable medium storing instructions thereon, wherein the instructions, when executed by one or more processors, cause the one or more processors to perform operations comprising:
receiving, at a static edge device associated with a static wide area network (WAN) Internet Protocol (IP) address in a data plane of a software-defined wide area network (SDWAN), data from a first device communicating through an edge device of a first Internet service provider (ISP) of the SDWAN, wherein the first device is associated with a private IP address;
associating, by the static edge device, the first device with the private IP address;
communicating, by the static edge device, with the first device at the private IP address;
determining, by the static edge device, isolation from one or more controllers; and
automatically extending, by the static edge device and based on the determining of isolation from the one or more controllers, a lifetime of a security parameter.

16. The non-transitory computer-readable medium of claim 15, wherein the static WAN IP address of the static edge device is a static public WAN IP address.

17. The non-transitory computer-readable medium of claim 15, wherein the instructions, when executed by the one or more processors, cause the one or more processors to further perform operations comprising:
determining, by the static edge device, that the private IP address is different from a previous private IP address associated with the first device,
wherein associating the first device with the private IP address includes updating the previous private IP address to the private IP address.

18. The non-transitory computer-readable medium of claim 15, wherein the ISP includes a NAT entry identifying a translation between a public IP address associated with the first device and the private IP address, wherein the instructions, when executed by the one or more processors, cause the one or more processors to further perform operations comprising:
determining, by the static edge device, that the public IP address is different from a previous public IP address,
wherein the first device is associated with the private IP address by associating the first device with the public IP address, and wherein associating the first device with the public IP address includes updating the previous public IP address to the public IP address.

19. The non-transitory computer-readable medium of claim 15, wherein the instructions, when executed by the one or more processors, cause the one or more processors to further perform operations comprising:
sending, from the static edge device and based on the determining of isolation from the one or more controllers, a new security parameter to the first device.

20. The non-transitory computer-readable medium of claim 15, wherein the security parameter is an IP security (IPsec) key or a security association.

\* \* \* \* \*